US010231430B2

(12) United States Patent
Weiss et al.

(10) Patent No.: US 10,231,430 B2
(45) Date of Patent: Mar. 19, 2019

(54) ANIMAL HOUSE CLIMATE CONTROL SYSTEM AND METHOD FOR AUTOMATIC CONFIGURATION AND EQUIPMENT SUBSTITUTION IN THE SYSTEM

(71) Applicant: The GSI Group, LLC, Hesston, KS (US)

(72) Inventors: Adam Weiss, Forsyth, IL (US); Benoit R. Laberge, St-Hubert (CA); Yvon Gaudreau, St-Hubert (CA); Khaled Saad, La Prairie (CA); Nicolas Bégin, Saint-Jean sur Richelieu (CA)

(73) Assignee: The GSI Group LLC, Assumption, IL (US)

( * ) Notice: Subject to any disclaimer, the term of this patent is extended or adjusted under 35 U.S.C. 154(b) by 242 days.

(21) Appl. No.: 15/173,213

(22) Filed: Jun. 3, 2016

(65) Prior Publication Data

US 2016/0353705 A1    Dec. 8, 2016

Related U.S. Application Data

(60) Provisional application No. 62/170,546, filed on Jun. 3, 2015.

(51) Int. Cl.
*A01K 1/00* (2006.01)
*G05B 15/02* (2006.01)
(Continued)

(52) U.S. Cl.
CPC .......... *A01K 1/0052* (2013.01); *A01K 1/0047* (2013.01); *F24F 11/30* (2018.01);
(Continued)

(58) Field of Classification Search
CPC .. A01K 1/0047; A01K 1/0052; A01K 1/0076; A01K 41/023
See application file for complete search history.

(56) References Cited

U.S. PATENT DOCUMENTS 4,773,471 A    9/1988  Grant et al.
4,930,446 A *  6/1990  Huisinga .............. A01K 1/0047
                                                       119/448
(Continued)

OTHER PUBLICATIONS

European Patent Office, International Search Report for related International Patent Application No. PCT/US2016/035767, dated Sep. 15, 2016.

*Primary Examiner* — Son T Nguyen

(57) ABSTRACT

A climate control system for an animal house is operated by determining a minimum ventilation curve for required minimum ventilation. A plurality of ventilation stages is created based on the minimum ventilation curve and the plurality of ventilation fans in the climate control system, each stage providing a percentage of the required minimum ventilation. Creating the stages includes prioritizing the ventilation fans to create a selection hierarchy and determining a minimum stage ventilation and a maximum stage ventilation for each stage. Ventilation fans are selected following the hierarchy that provides the desired percentage of the minimum required ventilation. The system advances from a lower stage a higher stage based on ventilation requirements. When it is determined that a fan is not operating, the system returns to the lower stage to substitute ventilation fans.

2 Claims, 8 Drawing Sheets

(51) Int. Cl.
    *F24F 11/30*     (2018.01)
    *F24F 11/62*     (2018.01)
    *F24F 11/64*     (2018.01)
    *F24F 11/77*     (2018.01)
    *F24F 110/10*     (2018.01)
    *F24F 110/40*     (2018.01)

(52) U.S. Cl.
    CPC .............. *F24F 11/62* (2018.01); *F24F 11/64* (2018.01); *F24F 11/77* (2018.01); *G05B 15/02* (2013.01); *F24F 2110/10* (2018.01); *F24F 2110/40* (2018.01)

(56) References Cited

U.S. PATENT DOCUMENTS

| | | | | |
|---|---|---|---|---|
| RE33,600 E | * | 6/1991 | Timmons | A01K 1/0047 119/306 |
| 5,341,988 A | * | 8/1994 | Rein | F24F 11/00 236/49.3 |
| 5,573,179 A | * | 11/1996 | Timmons | A01K 1/0047 236/49.3 |
| 2006/0064999 A1 | * | 3/2006 | Hermerding | G06F 1/206 62/259.2 |
| 2006/0091229 A1 | * | 5/2006 | Bash | H05K 7/20745 236/49.3 |
| 2014/0000527 A1 | | 1/2014 | Martin | |
| 2016/0120144 A1 | * | 5/2016 | Kim | A01K 1/0047 119/437 |
| 2016/0227726 A1 | * | 8/2016 | Priest | A01K 1/0047 |

\* cited by examiner

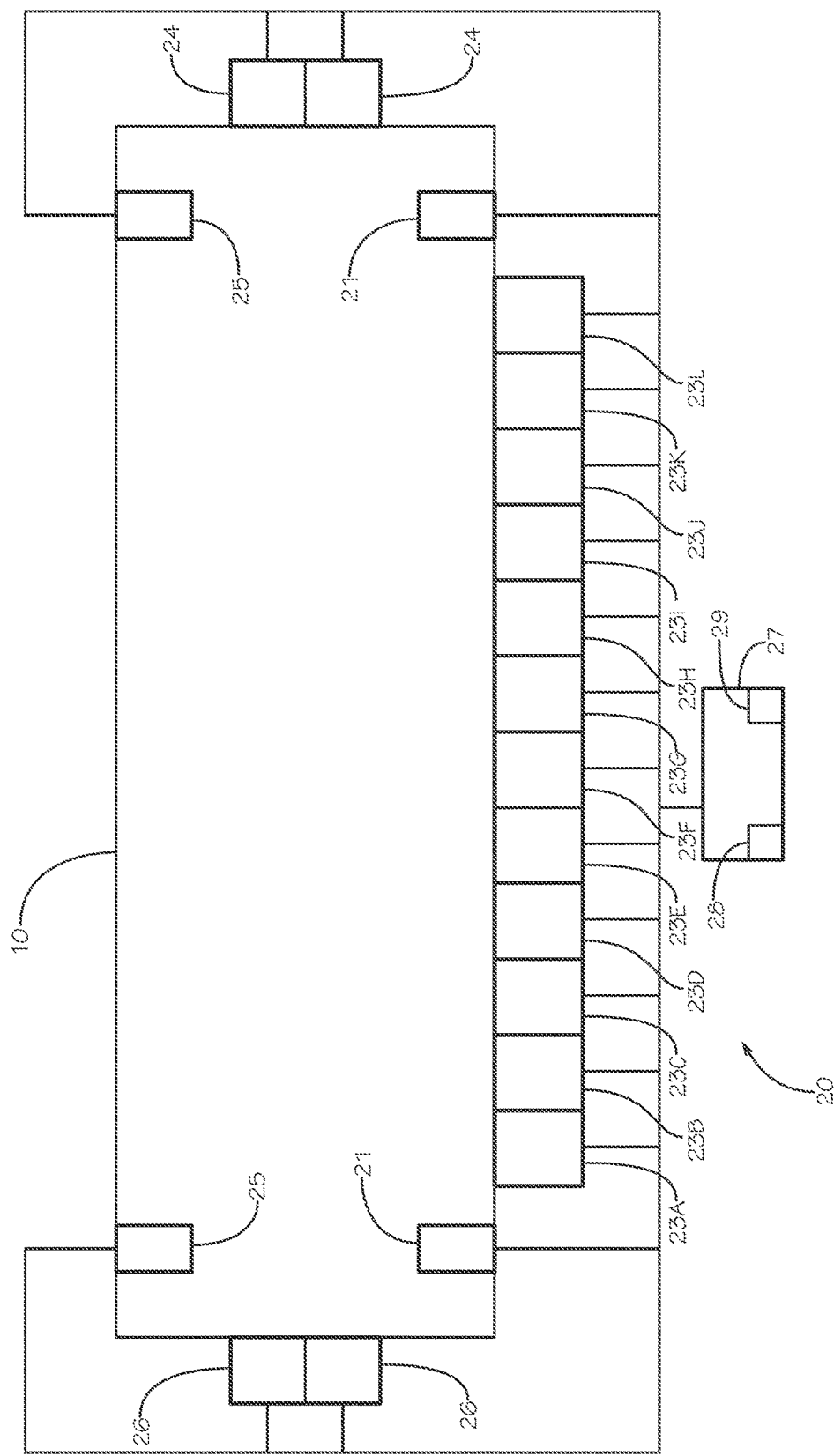

Summer Over 70
Winter Under 30

| POWER | | | | | | Variable | Variable | Variable | Variable | Relais | Relais | | |
|---|---|---|---|---|---|---|---|---|---|---|---|---|---|
| Name | Cfm capacity | | Operating temperatures Bandwidth 8 | | | Fans | | | | | | | |
| | | | | | | Pit Fan 1 | | Pit Fan 2 | | Sidewall 1 | Sidewall 2 | Sidewall 3 | Sidewall 4 |
| | Min | Max | Start | Stop | Max | 6600 | | 13200 | | 16200 | 16200 | 10400 | 10400 |
| Stage 1 | 2640 | 5940 | 70 | | 71.7 | 40% | 90% | | | | | | |
| Stage 2 | 5940 | 11880 | 71.7 | 71.4 | 72.9 | | | 45% | 90% | | | | |
| Stage 3 | 12210 | 17820 | 73.0 | 72.7 | 73.7 | 65% | 90% | 60% | 90% | | | | |
| Stage 8 | 73000 | 73000 | 78.0 | 76.5 | - | 100% | 100% | 100% | 100% | 100% | 100% | 100% | 100% |

| Natural | Open At | Close At | MaxOpenAt | | | | | | |
|---|---|---|---|---|---|---|---|---|---|
| | 84 | 83 | 87 | off | on | on | off | off | on |
| | 85 | 84 | 88 | off | off | off | off | off | off |

| Skip Power | Open At | Close At | MaxOpenAt |
|---|---|---|---|
| | 77 | 76 | 80 |

At first all stages are given same settings

| NATURAL WHISKER SWITCH FUNCTIONS | | | | | | | | | | | |
|---|---|---|---|---|---|---|---|---|---|---|---|
| Off | Off | Off | Off | Off | Off | Off | Off | Off | Off | Off | Off |

| Skip Power | 78 | 76 | 81 |
|---|---|---|---|

| NATURAL WHISKER SWITCH FUNCTIONS | | | | | | | | | | | |
|---|---|---|---|---|---|---|---|---|---|---|---|
| Off | Off | Off | Off | Off | Off | Off | Off | Off | Off | Off | Off |

| Skip Natural | Start | Stop | Max |
|---|---|---|---|

| TUNNEL WHISKER SWITCH FUNCTIONS | | | | | | | | | | | |
|---|---|---|---|---|---|---|---|---|---|---|---|
| Off | Off | Off | Off | Off | Off | Off | Off | Off | Off | Off | Off |

| TUNNEL | | | | | | | | | | | | | |
|---|---|---|---|---|---|---|---|---|---|---|---|---|---|
| Name | Cfm capacity | | Bandwidth | 8 | | TUNNEL Fans | | | | | | | |
| | | | Start | Stop | Max | Tunnel 1 | Tunnel 2 | Tunnel 3 | Tunnel 4 | Tunnel 5 | Tunnel 6 | | |
| | Min | Min | | | | 22000 | 22000 | 44000 | 44000 | 44000 | 44000 | | |
| Stage 1 | 33000 | 44000 | 88.0 | 86.5 | 83.5 | 100% | 100% | 50% | 100% | | | | |
| Stage 2 | 44000 | 44000 | 88.5 | 87.0 | - | 100% | 100% | 100% | 100% | | | | |
| Stage 3 | 88000 | 88000 | 90.4 | 88.9 | - | 100% | 100% | 100% | 100% | 100% | 100% | | |
| Stage 4 | 132000 | 132000 | 92.2 | 90.7 | - | 100% | 100% | 100% | 100% | 100% | 100% | 100% | 100% |
| Stage 5 | 220000 | 220000 | 96.0 | 94.5 | - | 100% | 100% | 100% | 100% | 100% | 100% | 100% | 100% |
| Stage 6 | 220000 | 220000 | 96.0 | 94.5 | - | 100% | 100% | 100% | 100% | 100% | 100% | 100% | 100% | 100% | 100% |

Lock out time; - Once out of tunnel there is a minimum time to allow before going back to tunnel
variable lock out time on transition cross/tunnel/cross (Evolution has a standard 30 min) - Dec 9th doc.
To Allow Tunnel:
Minimum Age
Minimum Outside Temp
In Tunnel - Rotate fans is possible - Among groups of fans at same ends
Rotate fans - Yes - Among groups of fans at same ends
No timer fan beside far rotation cycle among different group-no variable cfm on a stage
Allspeed on the grid epresents airspeed at the inlet
Do not need tunnel inlet allspeed to vary vs ToutOnly 1 allspeed 1 opening per stage.
Also wanted to show floor air speed
Tunnel can never start before last Power stage-always a 0.5F between last Power Start And 1st Tunnel Start
Be Lock out time;-Once out of tunnel there is a minimum time to allow before going back to tunnel
Tunnel Inlets
No temperature compensation
We want SPcompensation

| | Winter | Summer |
|---|---|---|
| Hi | 0.1 | 0.06 |
| Lo | 0.07 | 0.03 |

| T comp | S.P. Comp |
|---|---|
| Y | Y |
| Y | Y |
| Y | Y |
| N | N |

| Curtain N | | | | Curtain S | | | | Tunnel | |
|---|---|---|---|---|---|---|---|---|---|
| Opening summer | | Opening winter | | Opening summer | | Opening winter | | Opening summer | |
| Min | Max | Min | Max | Min | Max | Min | Max | Min | Max |
| Closed | 100% | | | Closed | | | | Closed | Closed |
| Closed | | | | Closed | | | | Closed | Closed |
| Closed | | | | Closed | | | | Closed | Closed |
| Closed | | | | Closed | | | | Closed | Closed |

NATURAL WHISKER SWITCH FUNCTIONS

| 8% | 100% | 6% | 50% | 8% | 100% | 6% | 50% |

| Follow Curtain N |
| --- |
| or Closed |

| Closed |
| --- |

| Closed |
| --- |

| Air speed Ft/min | Tunnel Door 1 235 | | | S.P. | Tunnel Door 2 200 | | | S.P. |
|---|---|---|---|---|---|---|---|---|
| Summer | Ratio | Opening Min | Max | winter | Ratio | Opening Min | Max | winter |
| 600 | 100% | 23% | 31% | Y | 0% | 0% | 0% | N |
| 600 | 100% | 23% | 31% | Y | 0% | 0% | 0% | N |
| 600 | 80% | 50% | 50% | N | 20% | 15% | 0% | Y |
| 600 | 60% | 56% | 56% | N | 40% | 44% | 44% | Y |
| 600 | 60% | 94% | 94% | N | 40% | 73% | 73% | Y |
| 600 | 60% | 94% | 94% | N | 40% | 73% | 73% | Y |

FIG. 7

ANIMAL HOUSE CLIMATE CONTROL SYSTEM AND METHOD FOR AUTOMATIC CONFIGURATION AND EQUIPMENT SUBSTITUTION IN THE SYSTEM

CROSS REFERENCE TO RELATED APPLICATION

This application claims the benefit of U.S. Provisional Application No. 62/170,546 filed Jun. 3, 2015, which is hereby incorporated by reference in its entirety.

BACKGROUND OF THE INVENTION

Field of Invention

This invention relates to climate control systems for buildings used to house animals, and more particularly to a method for automatically configuring the and substituting equipment in the climate control system.

Description of Related Art

In buildings that are used to house animals such as poultry, swine or livestock, it is important to maintain a desired building climate. A well-controlled environment involves monitoring and regulating the temperature, relative humidity and air quality in the building. For example, properly controlled temperatures enable animals to use feed for growth rather than for body heat. A properly heated animal house results in lower feed costs and increased animal productivity. Additionally, control over the level of humidity in the building is necessary because excess humidity contributes to animal discomfort and promotes the growth of harmful air born bacteria that can cause respiration diseases. Having an elevated humidity level in the animal house may also lead to more frequent changes of bedding and litter which increases production costs.

To maintain the proper climate in the animal building, various heaters and ventilation fans are used as necessary to maintain the desired temperature and humidity. It is known to use a control unit to automatically control operation of the heaters and ventilation fans located within the building. Sensing devices, such as temperature sensing devices, are used to provide the necessary information to the control unit to enable such automatic control. Improper operation of any of the heaters or ventilation fans can lead to undesirable and even dangerous conditions in the animal budding.

Configuration of a climate control system for protein applications is a cumbersome task that involves a great deal of knowledge of animal husbandry, protein equipment and systems, and control philosophies and technology. Control systems typically manage many diverse functions, such as heating, cooling, ventilation, feeding, and watering, each of which requiring significant effort to configure. Even the most skilled person is prone to making mistakes or forgetting something when configuring such a complex system. Assuming the system does get configured properly, it is usually a long, time-consuming task involving several steps.

First, the user must program the controller to tell it what equipment (fans, inlets, feeders, temperature probes, etc.) is physically connected to the device, and how it is connected. Next, the user must configure the detailed parameters for each function. This is the time-consuming portion, and where the industry knowledge is transferred to the controller. For example, in a poultry application, the controller may be controlling lighting. After the user first tells the controller which output is used for lighting, he must then program how the lights should work. This is typically done my creating a lighting program or "curve", which consists of a series of table entries where for a specific age of the birds, a light on/off/intensity setting is set. The user configures as many table entries as he feels is required to properly grow the birds.

Once the lighting program is set, the user would then have to go through a detailed configuration effort for each system to be controlled. For example, next, the user might configure heaters. Then he might configure feeders or ventilation.

In protein growing industry, a large amount of application specific actuators are used for building control and automation. The animal living environment control is life-critical; improper ventilation can lead to poor herd performance and animal death. Equipment fault happens often, without warning and at any time. Quickness and automated reaction to a failure is an asset for both the animals and the site owner. Protein growing buildings are designed to fulfill the needs of animals from their birth to their shipping to the next step of the process throughout the year; HVAC (heating, ventilation and air conditioning) equipment can heat, dry, cool, humidify and move air as needed. Specific equipment is used for specific conditions in such a way that actuators get segregated in a set of discrete operating conditions to fulfill the vast set of ventilation needs. The new PVX system breaks the rules so that the different sets of equipment are seen as resources to achieve an overall goal; maintain proper living and growing conditions. By sensing operating current of each piece of equipment (and potentially aggregating the information with other data) the system can discriminate faulty and good actuators. Knowing an actuator has failed another similar device is used to achieve the overall goal. The important part of the invention is there is no redundant piece of equipment waiting for a failure to be turned on, it is really another piece(s) of equipment normally used in different conditions which are used in a different way to accomplish the task of the failed equipment.

Devices in protein raising barns are part of a sub system and used in specific building state and operating conditions. Although small fans are used in the so-called minimal or sidewall ventilation and tunnel fans for tunnel ventilation, one can replace the other in certain circumstances. Looking at fans as "ventilation units" and knowing their position in a building, a controller can calculate what is the ventilation contribution of a fan according to operating conditions and decide which equipment to use in order to temporary replace another failed equipment and this with minimum loss of performance.

The principle can be extended to other types of actuators; an air inlet that fails to open can be backed up by other similar air inlet which is normally closed in current operating conditions if the overall effect of providing more air is better than a modification of air mix or air flow pattern.

To achieve this goal, key characteristics and operating parameters of actuators need to be known and measured to detect failure and confirm backup measures have been applied. Characteristics are either entered by user for non-listed devices or read from a database of known existing equipment. The key measured parameter is amp draw and motor angular velocity (RPM) when available. An out of range amp draw can mean a broken mechanical link (low amp draw) or jammed equipment such as a blocked rotor (high amp draw). Depending on the situation it is advisable to turn of the failed equipment (to protect it from further damage) and to use another similar (or less similar) equipment to achieve the same goal while raising an alarm to warn the user.

This concept is extended to a failure of the controller output itself; a failed relay or contactor can be detected and similar or calculated backup equipment can be turned on via other still good outputs. In fact, it may be impossible to discriminate if a failure originates from the controller output, the wiring or the actuator itself but it is almost always possible to discriminate a normal operating device from a failure and to take backup actions.

In previous systems, equipment such as fan are hardwired to an input which is assigned a dedicated function (i.e. this output is a tunnel fan which should be turned On when room temperature is greater than 85° F.). Some controllers are capable of measuring amp draw and will raise an alarm however they do not backup the failed actuator with any other piece of equipment. Other controllers make it easy for a user to disconnect a device from a failed output and to reconnect it to another known good output. None however automatically take backup actions, they would simply raise an alarm. It is desired to have a climate control system that will allow the user to quickly set up a complex system with very little interaction or knowledge.

OVERVIEW OF THE INVENTION

In one embodiment, the invention relates to a method for operating a climate control system for use with an animal house. The climate control system is configured to operate in an automatic setting for the number and type of animals contained within the animal house and substitute operation if required. The climate control system has a plurality of climate control input devices to measure a temperature of a location within the animal house. The climate control system also has a plurality of ventilation fans and a control unit configured to receive temperature input from the input devices and operate the plurality of ventilation fans. The method includes determining a minimum ventilation curve comprising required minimum ventilation for the animals contained within the animal house and identifying the plurality of input devices and plurality of ventilating fans in the climate control system to the control unit. The method includes determining a plurality of ventilation stages based on the minimum ventilation curve and the plurality of ventilation fans in the climate control system, wherein each stage provides a desired percentage of the minimum required ventilation. Determining the plurality of ventilation stages includes prioritizing the plurality of ventilation fans to create a selection hierarchy, determining a minimum stage ventilation and a maximum stage ventilation for each ventilation stage, determining a group of ventilation fans from said plurality of ventilation fans following the selection hierarchy that provides the desired percentage of the minimum required ventilation, and defining an increment between a maximum stage ventilation one of said plurality of ventilation stages and a minimum stage ventilation for a next higher ventilation stage of said plurality of ventilation stages, wherein the minimum capacity level is a function of the minimum capacity of the group of ventilation fans added to the next higher stage, and the maximum capacity for the next higher stage is determined based on the increment. The method includes continuing to define the plurality of ventilation stages until all of the plurality of ventilation fans are used in a group of fans for a ventilation stage. The method includes determining a start and stop temperature for each of the plurality of stages, and advancing from a lower stage of said plurality of stages to a higher stage based on ventilation requirements as determined by temperatures received by the control unit from the input devices. The method includes determining that one of said ventilation fans in the group of ventilation fans for the current selected ventilation stage is not operating and returning to the lower stage of said plurality of stages from the higher stage to substitute ventilation fans for the climate control system.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 is a schematic drawing of a climate control system of an animal house;

FIG. 5 is a chart showing results of a method according to one embodiment of the invention;

FIG. 6 is a chart showing results of a method according to one embodiment of the invention; and FIG. 7 is a chart showing results of a method according to one embodiment of the invention.

Corresponding reference characters indicate corresponding parts throughout the views of the drawings.

DETAILED DESCRIPTION OF EXEMPLARY EMBODIMENTS

Figure 2A:
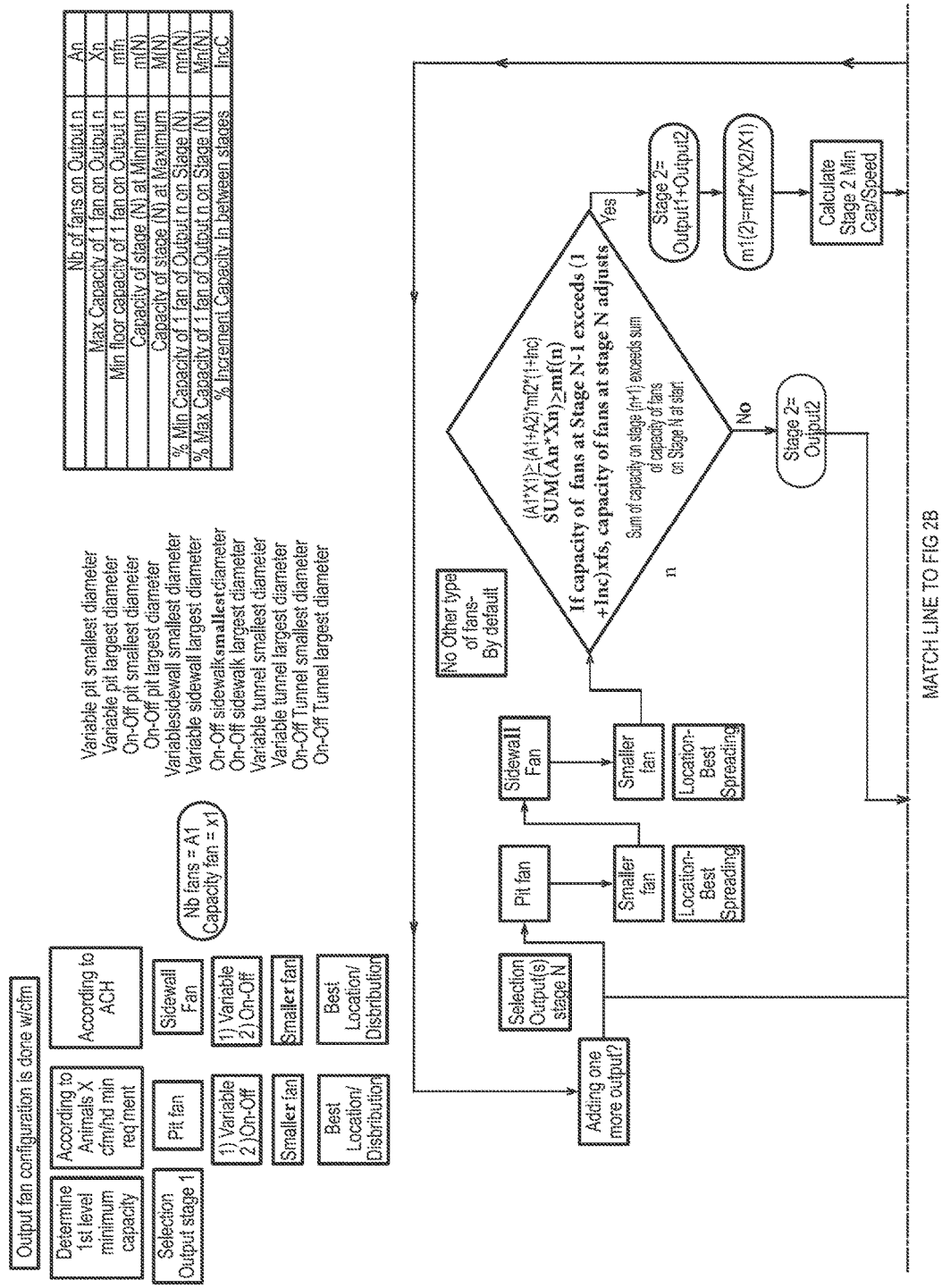
FIGS. 2A and 2B are a flow diagram of a method according to one embodiment of the invention.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Referring to FIG. 1, a schematic of an animal house 10 having a climate control system 20 is shown. The climate control system 20 has a plurality of climate control input devices, such as temperature or static pressure probes, indicated at 21. The sensing devices 21 may be located in different portions of the animal house 10 so that climate information, such as temperature and static pressure, may be received for the different portions. Although two input devices 21 are shown, it will be understood that this is for purposes of illustrations only, and that additional or fewer input devices may be provided, as required. The climate control system 20 also has a plurality of climate control output devices, such as ventilation fans 23, heaters 24 and/or lighting units 25 mounted in the building 10. Although twelve ventilating fans 23, two heaters 24 and two lighting units 25 are shown, it will be understood that this is for purposes of illustrations only, and that additional or fewer heaters and fans may be provided, as required. Ventilation fans are referred broadly using reference number 23, but one skilled in the art will understand that different types of ventilation fans are used with animal houses 10. FIG. 1 illustrates different possible types of ventilation fans 23 as a variable pit smallest diameter 23A, variable pit largest diameter 23B, on-off pit smallest diameter 23C, on-off pit largest diameter 23D, variable sidewall smallest diameter 23E, variable sidewall largest diameter 23F, on-off sidewall smallest diameter 23G, on-off sidewall largest diameter 23H, variable tunnel smallest diameter 23I, variable tunnel largest diameter 23J, on-off tunnel smallest diameter 23K and on-off tunnel largest diameter 23L. Typically, climate control systems 20 will have more than one type of ventilation fan 23, but need not have every type of ventilation fan 23A-L shown in FIG. 1 to meet the requirements of the invention.

Various air inlets such as sidewall inlets, ceiling inlets and or tunnel inlets, indicated at 25, are used by the climate control system 20 to control airflow into the animal house 10. Although two air inlets 26 are shown, it will be understood that this is for purposes of illustrations only, and that additional or fewer air inlets may be provided, as required.

The climate control system 20 has a main control unit 27, which incorporates a suitable controller, such as a microprocessor controller 28 and a memory 29 for storing lookup tables. The control unit 27 receives input information from the input devices 21 and regulates the operation of the ventilating fans 23, heaters 24, lighting 25 and the air inlets 26. According to the invention, the control unit 27 of the climate control system 20 is configured to automatically configure the operation of the system 20 based on users' intentions provided by basic input and embedded industry knowledge stored in the memory 29. The configuration process begins by obtaining high-level application information so the system 20 can ascertain how the controller 28 will be used.

Initially, the climate control system 20 must learn the type of animal that will be housed in the animal house 10. For example, the climate control system 20 can be used in an animal house 10 with poultry, swine or other types of animals. Further classification can be entered based on the type of animal. For example, if the climate control system 20 will be used with poultry, further classification can select if is it a broiler application, a layer application, a breeder application, etc.

One will understand that poultry, swine and livestock management is a dynamic process. Many environmental parameters vary with age of the animal as well as outside temperature. Desirably, the climate control system 20 integrates settings curves stored in memory 29 that allows the farm managers entering their settings according to animal's age. Among these curves there can be a target temperature (set point) curve. A minimum ventilation curve (in cfm/hd) is used (with winter/summer values). The /hd feature has the advantage of considering animal counts and automatically adjusts ventilation parameters. A bandwidth (ventilation "gain" curve) is used (with winter/summer values) as will be described more fully below. Natural ventilation curves are used (Minimum opening, Natural ventilation Bw, Max opening according to Age) (with winter/summer values). A cooling pad curve is used (with Allowable T outside according to Age). A light schedule vs. age is used. It is also desirable to store feeding schedules and watering schedules. Desirably, these curves can be accessed, modified, created and activated at any time through a built-in control unit curve Editor.

The climate control system 20 must also learn what input devices 21, ventilating fans 23, heaters 24, lighting 25 and air inlets 26 are in the system 20. For example, the control unit 27 learns that a temperature probe is connected on a first input, an on/off heater on a first relay, a tunnel fan on a second relay, etc. The user enters the device, such as the manufacturer and model number for a ventilation fan 23, and the control unit 27 obtains required manufacturer specifications from a lookup table stored in the memory 29.

Once the control unit 27 has this information, it will then automatically configure all of the systems for the desired application based on industry best-practices and domain knowledge. The user desirably has the option to modify the system recommended settings, however, the system 20 would be able to safely raise the animals with the system defaults. For example, in a poultry application using lighting, the system would detect that lights have been physically connected, it would also know if they've been connected to an on/off relay, or a variable output. The system would also know if it is being used in a broiler application. With this knowledge, the control unit 27 will create all the necessary configurations for every system it controls. i.e., ventilation, heating, etc. For example, it would create a lighting program that begins at day 1 (bird age) with lights on for 24 per day. It would then operate the lights 16 hours on/8 hours off from days 8-28 and so on.

The method of configuring the climate control system 20 includes determining the minimum ventilation required. This is based on the type and age of animal and the air temperature and is stored in a lookup table in memory 29. Table 1 gives example ventilation rates for swine and is used for example purposes only.

TABLE 1

| Check 3 ACH (air change per hour) | |
|---|---|
| Production | Cfm @−15 F. |
| Farrowing | 22 |
| Gestation | 14 |
| Nursery | 3 |
| Growing | 7 |
| Finishing | 9 |

In one example, the minimum ventilation is taken for winter temperatures and is used to set the floor level for ventilation.

Figure 2B:
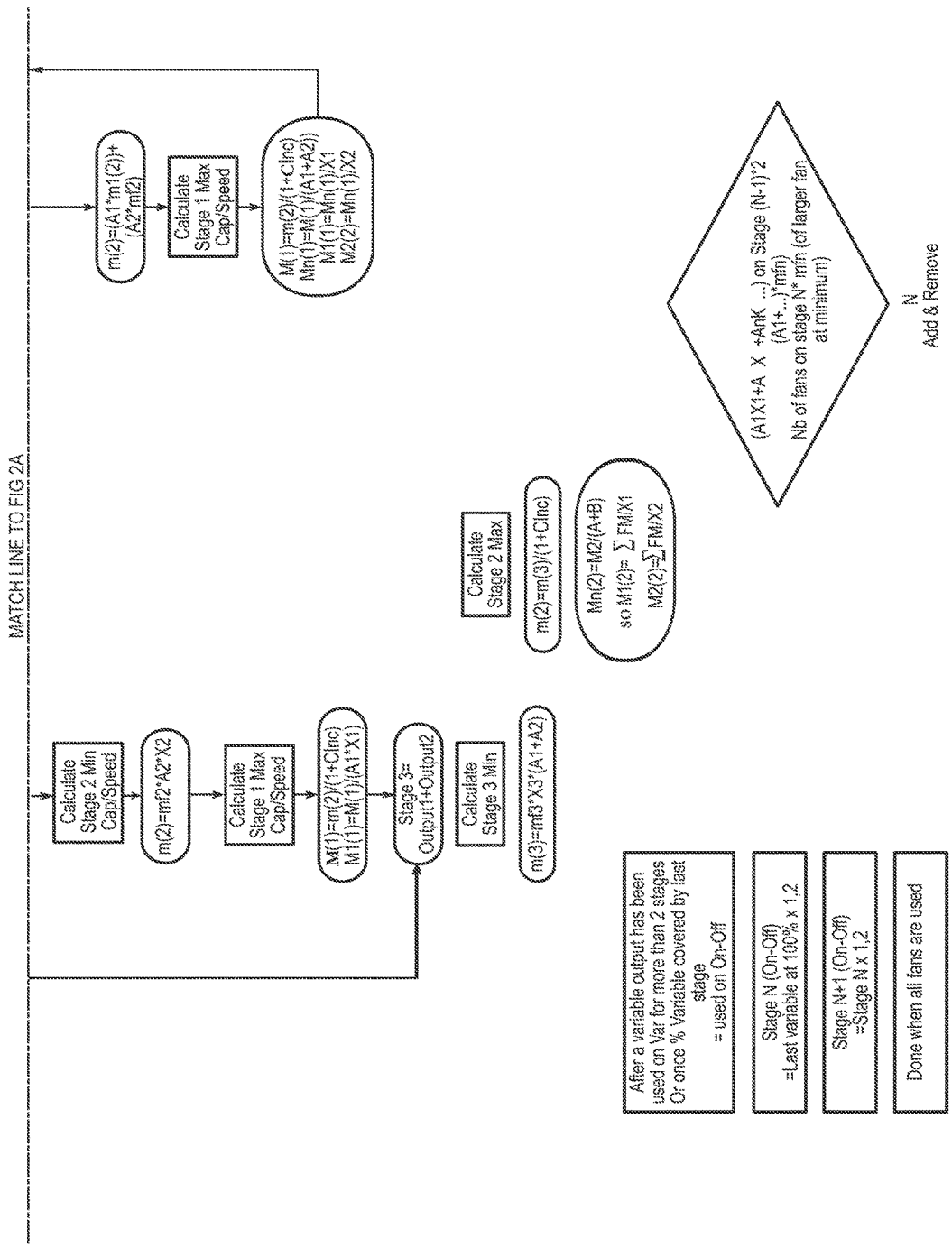
Figure 3:
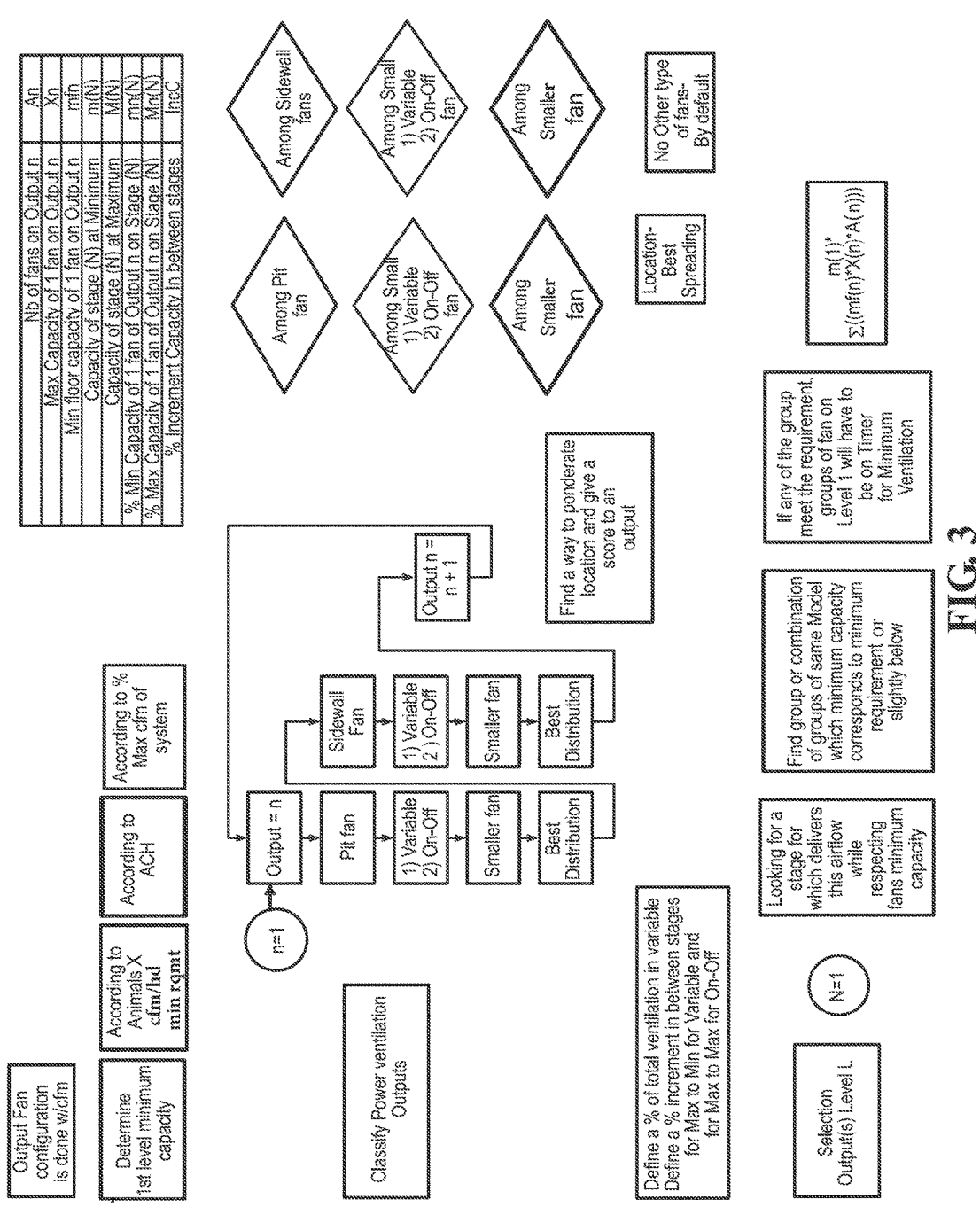
FIG. 3 is a flow diagram of a method according to one embodiment of the invention.
Figure 4:
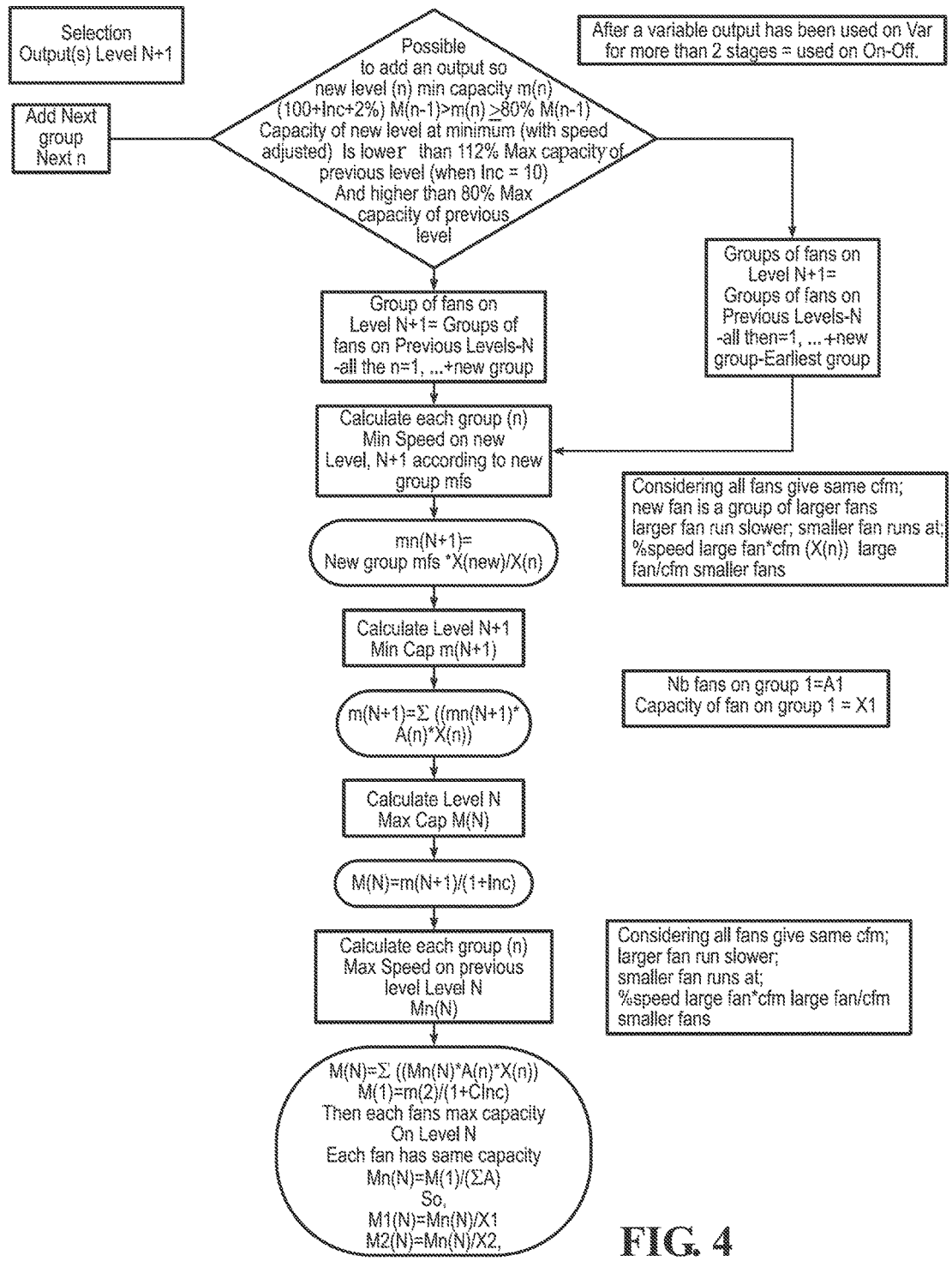
FIG. 4 is a flow diagram of a method according to one embodiment of the invention.

Referring also now to the decision trees shown in FIGS. 2-4, the method of configuring the climate control system 20 includes determining a plurality of ventilation stages based on the minimum ventilation and the number and type of ventilation fans 23 in the system 20. Desirably, the minimum ventilation is made with 40% (% min) of a stage. The control unit 27 then determines a group of fans giving the minimum required cfm/0.4. In one embodiment, the control unit 27 selects the fans 23A-L using prioritized selection hierarchy shown in Table 2.

TABLE 2

| Fan Order Hierarchy |
|---|
| 1. Variable pit smallest diameter 23A |
| 2. Variable pit largest diameter 23B |
| 3. On-Off pit smallest diameter 23C |
| 4. On-Off pit largest diameter 23D |
| 5. Variable sidewall smallest diameter 23E |
| 6. Variable sidewall largest diameter 23F |
| 7. On-Off sidewall smallest diameter 23G |
| 8. On-Off sidewall largest diameter 23H |
| 9. Variable tunnel smallest diameter 23I |
| 10. Variable tunnel largest diameter 23J |
| 11. On-Off Tunnel smallest diameter 23K |
| 12. On-Off Tunnel largest diameter 23L |

Additionally, it is desired that the control unit 27 also consider fan location for best exhaust distribution.

The method defines an increment, between Max Stage N to Min Stage N+1. The increment is desirably between about 10-15% of the air flow.

As the system typically has both variable ventilation fans 23A-B, E-F, I-J, the method defines a Total of % cfm provided by variable fans. Desirably, ventilation requirements are 40% covered with variable stages.

Next, the control unit 27 finds a group for stage 2 which minimum capacity is:

≥0.7*(1+Increment) cap max fans stage 1
<(1+Increment) cap max fans stage 1

The hierarchy in Table 2 is again utilized. The method calculates stage 2 Start cfm. With the stage 2 start cfm requirement, the method calculates fan groups capacities on stage 2. The minimum capacity level is a function of the minimum capacity (floor) of the group of fans added to the new stage.

On a variable stage, the minimum and maximum capacity of each variable output fan 23A-B, E-f, I-J, must be adjusted to meet the required cfm. The variable outputs of a variable stage do not always run at the same speed. Different models of fan would run at different speed to give same cfm. The minimum capacity (floor) and maximum (100%) of a variable output fans 23A-B, E-f, I-J, are dictated by the motor curve for the individual fan, which is stored in a lookup table in the memory 29.

Typically, it has been assumed that cfm of fan is proportional to its speed (rpm). With the method used by the climate control system 20, however, it is not the value of speed that matters; what is controlled in the climate control system 20 is the percent of maximum capacity in cfm as this value refers directly to the airflow (in cfm).

The method determines the maximum capacity stage 1 based on the desired increment.

Next, the control unit 27 finds a group for stage 3 which minimum capacity is:

≥0.7*(1+Increment) cap max fans stage 2
&<(1+Increment) cap max fans stage 2

The method calculates stage 3 Start cfm. With the stage 3 start cfm requirement, the method calculates fan groups capacities on stage 3. The minimum capacity level is a function of the minimum capacity (floor) of the group of fans added to the new stage. The maximum capacity for stage 3 is determined based on the desired increment.

Figure 6:
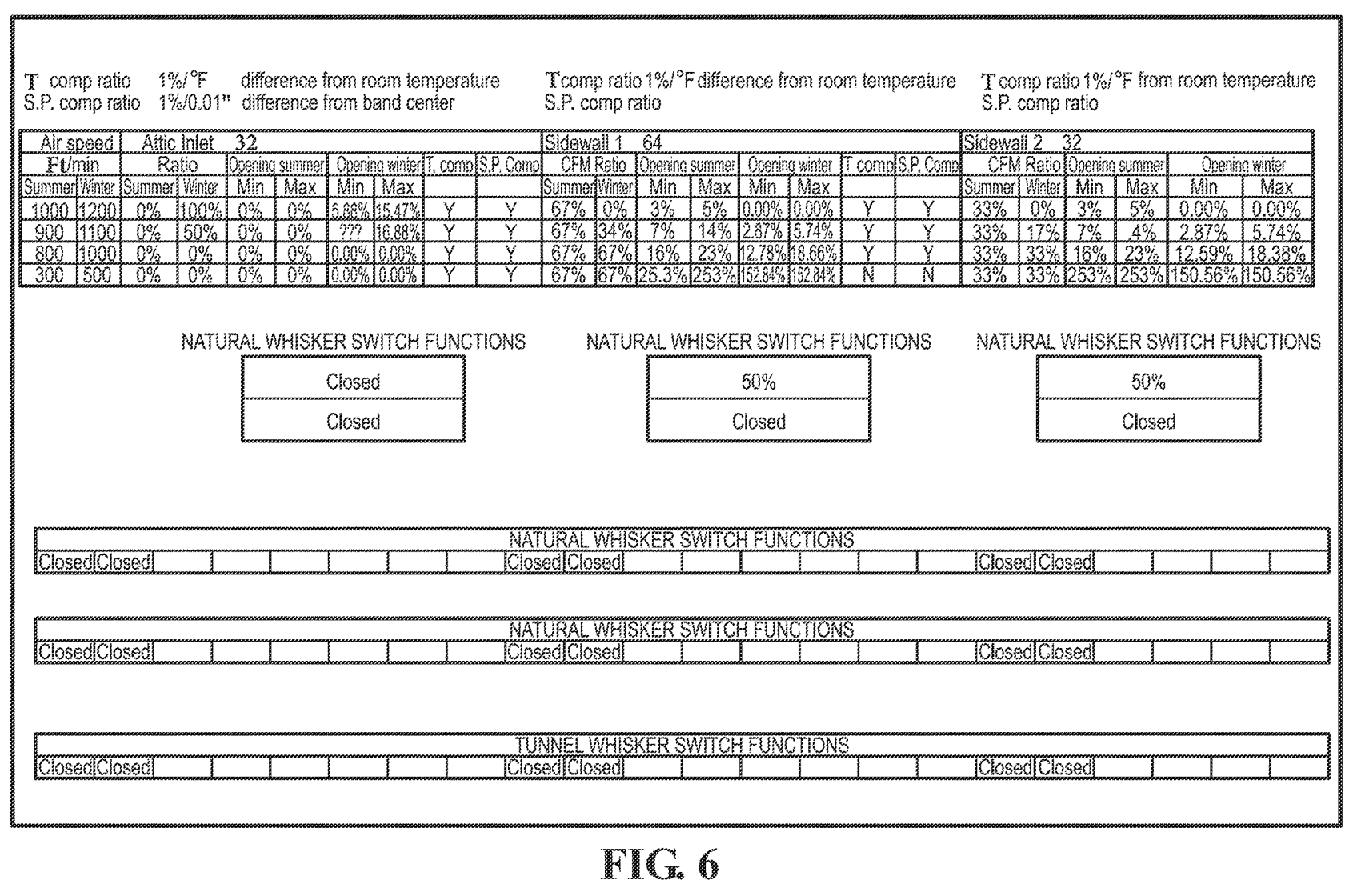

The method continues to define the parameters for each of the desired number of stages. With the rest of ventilation, on-off ventilation fans 23C-D, G-H, K-L, offer increments of 15-20% until all groups are used. Once the ventilation fans setup is made and ventilation stages are configured, a table is build and accessible into the control unit 27 with all ventilation Settings. Tables 3 and 4 and the charts in FIGS. 5-7 illustrate an example embodiment of a system having eight stages. Of course, more or fewer number of stages could be used without departing from the scope of the invention.

TABLE 3

| | NB OF STAGES | | | | |
|---|---|---|---|---|---|
| | 8 | | Variable | | Variable |
| | | | Operating temperatures | | |
| POWER | Cfm capacity | | Bandwidth | | 8 |
| Name | Min | Max | Start | Stop | Max |
| Stage 1 | 2640 | 5940 | 70 | | 71.73254 |
| Stage 2 | 5940 | 11880 | 71.73254 | 71.43254 | 72.8991 |
| Stage 3 | 12210 | 17820 | 72.95041 | 72.65041 | 73.71589 |
| Stage 4 | 18360 | 32400 | 73.78141 | 73.48141 | 75.20288 |
| Stage 5 | 32760 | 36000 | 75.23425 | 74.93425 | 75.50859 |
| Stage 6 | 36810 | 52200 | 75.57506 | 75.27506 | 76.71418 |
| Stage 7 | 62600 | 62600 | 77.38513 | 75.88513 | — |
| Stage 8 | 73000 | 73000 | 78 | 76.5 | — |

TABLE 4

| POWER | Fans Pit Fan 1 | | Pit Fan 2 | | Relais Sidewall 1 | | Relais Sidewall 2 | | Sidewall 3 | Sidewall 4 |
|---|---|---|---|---|---|---|---|---|---|---|
| Name | 6600 | Variable | 13200 | Variable | 16200 | | 16200 | | 10400 | 10400 |
| Stage 1 | 40% | 90% | | | | | | | | |
| Stage 2 | | | 45% | 90% | | | | | | |
| Stage 3 | 65% | 90% | 60% | 90% | | | | | | |
| Stage 4 | 60% | 90% | 60% | 90% | 40% | 80% | | | | |
| Stage 5 | 100% | 100% | 100% | 100% | 80% | 100% | | | | |
| Stage 6 | 100% | 100% | 100% | 100% | 55% | 100% | 50% | 100% | | |
| Stage 7 | 100% | 100% | 100% | 100% | 100% | 100% | 100% | 100% | 100% | |
| Stage 8 | 100% | 100% | 100% | 100% | 100% | 100% | 100% | 100% | 100% | 100% |

The method determines start and stop temperatures. The minimum and maximum ventilation capacity in cfm of each stage is displayed. A set point (Start of Stage 1) is automatically populated and is it is pulled from the temperature curve according to type of production from a lookup table in memory 29. The Cfm/hd for minimum ventilation is automatically populated as it is pulled from the ventilation setting curve according to type of production. A bandwidth (number of degrees from minimum ventilation to 100% ventilation) is automatically populated as it is pulled from the ventilation setting curve according to type of production.

The start and stop of all stages and maximum temperature of variable stage are automatically calculated according to the set point, the minimum cfm and bandwidth according to the equations below:

$$T_{startSn} = \text{Room T}° \text{ setpoint} + \sqrt{\frac{\text{cfm min } Sn - \text{cfm min vent}}{\text{cfm total} - \text{cfm min vent}}} \times BW$$

$$T_{maxS1} = \text{Room T}° \text{ setpoint} + \sqrt{\frac{\text{cfm max } S1 - \text{cfm min vent}}{\text{cfm total} - \text{cfm min vent}}} \times BW$$

$$T_{maxSn} = \text{Room T}° \text{ setpoint} + \sqrt{\frac{\text{cfm max } Sn - \text{cfm min vent}}{\text{cfm total} - \text{cfm min vent}}} \times BW$$

$$T_{stopSn} = T_{startSn} - 0.5° \text{ F.}$$

$$T_{stopSn} = T_{startSn} - 1.5° \text{ F.}$$

Desirably, some rules are implemented into the control system 20 to avoid wrong settings.

As described above, a bandwidth is used in the method. The bandwidth permits a user to use only 1 parameter to modify the gain of the power ventilation system, bandwidth. This parameter is easily accessible and can be tweaked temporarily or changed for good by the day to day operator. The bandwidth is a parameter that controls the response of the power ventilation system ventilation; it has an impact on all Start, Stop, and Max Stages temperature, yet still considers stage capacity to maintain a logical airflow as temperature increase as temperature varies and stages change.

Additional rules are implemented into the control system to avoid wrong settings desirably include a change on TStart & TMax of variable stages cause that stage and all following stages Settings to change accordingly. Moving a TStart down causes Stop & Max of that Stage to decrease accordingly and following Stages Start Max and stop to Decrease. Moving a TStart UP causes Stop & Max of that Stage to increase accordingly and following Stages Start Max and stop to Increase accordingly. Moving a TStart DOWN limited to 0.5 F (0.3 C) Start of previous Stage. By default TStart is set according to cfm Min. Moving a TMax UP or DOWN does not affect Start, Stop of that stage but causes all settings of following stages to move accordingly. T Max up limited to bumping last Stage Start to 40° C./104° F. Moving a TMax DOWN limited to 0.5 F (0.3 C) above Start of that stage. By default TMax of stage is set According to Stage cfm Max. Moving a TStop UP: Does only move that stage stop, no change to other stages. Variable Max limited to 0.3 F below Start of same Stage. On-Off Max limited to 0.5 F below Start of same Stage. Moving a TStop Down: Does only move that stage stop, no change to other stages. Tstop of variable stage limited to 0.5 F above Start of previous stage. Moving an On-Off Stop Down limited to 0.5 F above Set Point (possible to have all stages above stage 1 to stop a same temperature). By default TStop of a variable stage is set 0.3 F or 0.2 C below its Tstart. By default TStop of an On-Off stage is set 1.5 F or 0.8 C below its Tstart.

Air inlets 26 are also controlled by the method of the control unit 27. As would be understood, there could be many air inlets 26 in the animal building 10. The dimensions of the air inlets 26 are programed into the control unit 27 during from equipment configuration. The air inlets 26 are assigned to stages. Their contribution (by default, what % of incoming air "originates" from the inlets) is considered at each stage opening. Air inlet speed is set for winter and for summer. Example air speeds are shown in Table 5

TABLE 5

| | Air speed Ft/min | |
|---|---|---|
| | Summer | Winter |
| Stage 1 | 1000 | 1200 |
| Stage 2 | 900 | 1100 |
| Stage 3 | 800 | 1000 |
| Stage 4 | 700 | 900 |
| Stage 5 | 600 | 800 |
| Stage 6 | 500 | 700 |
| Stage 7 | 400 | 600 |
| Stage 8 | 300 | 500 |

For each stage, airspeed at the air inlet 26 is set. A minimum speed is used for the summer limit and a maximum speed is used for the winter limit. Interpolation in between summer and winter outside Temp values. The method uses the following equations for air inlets opening:
  i. Determine cfm output
  ii. Determine ratio (range of ratio)*
  *Outside temp determining ratio
  iii. Calculate cfm allowed in each Inlets: Allowed cfm=actual level cfm×Inlet ratio *
  iv. Opening, in ft2 for each inlet, calculate:
  Opening Inlet=Allowed cfm Inlet/Effective air speed* (calculated above
  *Outside temp determining ratio & airspeed
  Units: Cfm/(ft/min)=(ft3/min)/(ft/min)=ft2 (Length×Width)

The method uses an Opening T° zone air inlet compensation. This compensation is optional for inlet and for level of ventilation. This compensation is expressed as an absolute percentage of opening per degree difference between the average room temperature and the average of the inlet's probes.

The method uses an Opening static pressure (SP) compensation. This Compensation is optional per inlet and per level of ventilation. This compensation is expressed as an absolute percentage of opening per in, of water column ('w.c). S.P. between actual & target range values. Target values are issued of a calculation between Lo and Hi limits that are function of outside temperature, and calculated just like inlet airspeed and inlet ratio per level, above.

The control system 20 can also be used to substitute equipment if a fault should be detected. With the current state of the art, controllers have the ability to detect when equipment is not operating as expected. This is typically because of an equipment (e.g. fan, heater, inlet) failure, or because a user has manually overridden the controller. When these problems are detected by the controller, usually an alarm can be issued.

The control system 20 also uses a method for not only detecting and alarming on abnormal conditions, but to actually take corrective action by substituting equipment that is in working condition for equipment that is non-functional. For this invention, the controller must know the capabilities (e.g. CFM, BTU) and location of all the equipment it controls.

If a problem with a ventilation fan is detected, depending on the actual stage, a substitution logic goes as per the fan selection for a stage. The control unit 27 identifies the starting priority for the selection of the added fans added to the actual stage (showing a defect fan groups) and starts other fans to mitigate the problem. Desirably, the control unit 27 first, if fans of previous stages were shut off, reactivate these fans according to decreasing starting priority. Second, if all fans of previous stage are still assigned to actual stage, activate fan according to the priority hierarchy shown in Table 2. If many groups can be an option, the selection is desirably based on best location. Equipment must be in an auto to operate as a substitute.

If a problem with an air inlet is detected, an inlet substitution logic is used. Depending on the actual stage the substitution logic goes as inlet selection for that stage. The control unit 27 tries to operate other inlets. If a ceiling inlet fails, the control unit 27 operates other Ceiling inlet (if there are other Ceiling inlet zones). A closer zone is desirably prioritized. If there are no other ceiling inlets, the control unit 27 opens sidewall inlets. A closer zone is desirably prioritized. If the problem is not solved, the control unit 27 opens tunnel inlets. Desirably, tunnel inlets with smaller dimensions are prioritized first. If the problem is not solved, the control unit 27 opens natural inlets. A closer zone is desirably prioritized.

If a sidewall inlet fails, the control unit 27 opens other sidewall inlets. If there are no other sidewall inlets, the control unit 27 opens tunnel inlets. If the problem is not solved, the control unit 27 opens natural inlets, desirably one side only.

If a tunnel inlet fails, the control unit 27 opens other tunnel inlets if there are other tunnel inlets. If not, the control unit 27 opens sidewall inlets.

Compensate opening according to missing opening related to inlets in defect are provide opening in sq. ft.

If a problem with a heater is detected, the control unit 27 will start all stir fans into the room to mix and distribute warm air as per in a probe difference mode for stir fans As an example, let "A" be a 5 000 CFM (cubic feet per minute) fan used in tunnel ventilation type during hot days. "A" is a belt driven radial fan which draws 10 amps in normal operation. During a hot day, the belt breaks and amp draw drops to 4 amps—the no load motor current. Knowing the static pressure difference between each side of the propeller, the system knows that something happened with the fan. If that fan has a powered shutter leaving it open creates a huge local air inlet that can dramatically change the barn air flow pattern leaving some areas without fresh air. This particular installation does not feature another similar fan—they are all used at this time. However the system has other smaller fans for normal (less hot) days, "B", "C" and "D" with respectively 2000 CFM capability each. The system then compensates for the loss ventilation power with A, B and C.

The control system can also be configured in an offline configuration. The idea behind offline configuration is when a dealer or installer wants to save time and pre-configure control unit 27 in his office prior to going on site. The user knows how many modules and expansion boxes he has in his installation. He usually has a drawing showing how equipment is connected inside the barn.

For a blank control unit 27 (out of the box, never been connected to module), a module detection screen shows empty since there are no modules connected to it. The user can add Expansion boxes, 3 slots or 6 slots and rename them. Then the user can edit the expansion box and selects the type of modules that should be connected to each slot. For example, in a 3 slot expansion box, user can select an 8I/6R/4V/F for slot 1, 16I/6R/F for slot 2 and 8R for slot 3.

In Edit mode, the user must select a module type for each slot or selects "empty" when there are no modules connected to that slot. User can add as many expansion boxes he wants as long as the number of modules stays under 64. This is the maximum number of modules that we can connect to control unit 27. If the user has identical expansion boxes, he can create one and duplicates it.

Once the user completes the module configuration, he can assign equipment to his inputs and outputs. Per example, for a sidewall fan, depending on the wiring, user selects the expansion box, the slot and the output for an ON/OFF fan or which variable output for a variable fan. User can configure all his farm equipment offline including probes, fans, inlets, feeders, water meters, cooling systems, heaters and brooders etc. The user cannot test his equipment nor calibrate them offline since they are not physically attached to the system yet. User can assign probes to his equipment, per example heater 1 uses probe 1. User can setup his heating, brooding, cooling, feeding, water consumption and ventilation programs offline.

Once all equipment is configured and setup is done, user can connect the controller to the network. The control unit 27 will discover all expansion boxes and their modules that are connected to the network. The controller will match detected expansion boxes with the previously configured ones based on their configuration. Per example, if the control unit 27 detects an expansion box that has the following configuration:

Slot 1: 8I/6R/4V/F
Slot 2: 16I/6R/F
Slot 3: 8R

And if the user has previously configured a 3 slot expansion box with the same configuration as the detected one, the controller will replace the detected one name with the previously configured one.

In the case where the controller is not able to do the automatic matching because it didn't find an exact configuration, the user is prompted to do the matching manually. The system will not allow the user to match incompatible boxes. The system will not allow the user to start production if not all expansion boxes matching is complete.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A method for operating a climate control system for use with an animal house, the climate control system configured to operate in an automatic setting for the number and type of animals contained within the animal house, the climate control system having a plurality of climate control input devices to measure a temperature of a location within the animal house, the climate control system also having a plurality of ventilation fans, and the climate control system having a control unit configured to receive temperature input from the input devices and operate the plurality of ventilation fans, the method comprising:

determining a minimum ventilation requirement comprising required minimum ventilation for the animals contained within the animal house;
identifying the plurality of input devices and plurality of ventilating fans in the climate control system to the control unit;

determining a plurality of ventilation stages based on the minimum ventilation requirement and the plurality of ventilation fans in the climate control system, wherein each stage provides a desired percentage of the minimum required ventilation, wherein determining the plurality of ventilation stages comprises:

prioritizing the plurality of ventilation fans to create a selection hierarchy, wherein the selection hierarchy prioritizes the plurality of ventilation fans based on fan type and an airflow capacity for each of the ventilation fans, wherein the plurality of ventilation fans includes at least two different types of fans from the group consisting of variable pit fans, on-off pit fans, variable sidewall fans, on-off sidewall fans, variable tunnel fans, and on-off tunnel fans;

determining a minimum stage ventilation and a maximum stage ventilation for each ventilation stage;

determining a group of ventilation fans from said plurality of ventilation fans following the selection hierarchy that provides the desired percentage of the minimum required ventilation;

defining an increment between a maximum stage ventilation one of said plurality of ventilation stages and a minimum stage ventilation for a next higher ventilation stage of said plurality of ventilation stages, wherein the minimum capacity level is a function of the minimum capacity of the group of ventilation fans added to the next higher stage, and the maximum capacity for the next higher stage is determined based on the increment;

continuing to define the plurality of ventilation stages until all of the plurality of ventilation fans are used in a group of fans for a ventilation stage;

determining a start and stop temperature for each of the plurality of stages;

advancing from a lower stage of said plurality of stages to a higher stage based on ventilation requirements as determined by temperatures received by the control unit from the input devices;

determining that one of said ventilation fans in the group of ventilation fans for the current selected ventilation stage is not operating; and starting at least one substitute ventilation fan, wherein the substitute ventilation fan is selected using the selection hierarchy for the climate control system wherein the substitute ventilation fan started is a ventilation fan selected for a lower ventilation stage if the substitute ventilation fan is not selected for the higher ventilation stage.

2. The method of claim 1 wherein the selection hierarchy of the plurality of ventilation fans includes a smallest diameter variable pit fan, a largest diameter variable pit fan, a smallest diameter on-off pit fan, a largest diameter on-off pit fan, a smallest diameter variable sidewall fan, a largest diameter variable sidewall fan, a smallest diameter on-off sidewall fan, a largest diameter on-off sidewall fan, a smallest diameter variable tunnel fan, a largest diameter variable tunnel fan, a smallest diameter on-off tunnel fan, and largest diameter on-off tunnel fan.

* * * * *